Patented June 4, 1929.

1,715,599

UNITED STATES PATENT OFFICE.

CHARLES TURNEY HIXSON, OF AZTEC, NEW MEXICO, ASSIGNOR OF ONE-FOURTH TO WILLARD W. CAMPBELL, OF AZTEC, NEW MEXICO, AND ONE-FOURTH TO HENRY EARNEST PISCHEL, OF DURANGO, COLORADO.

NONCORRODIBLE BATTERY TERMINAL.

No Drawing.  Application filed July 5, 1927. Serial No. 203,676.

This invention relates to storage battery terminals and has for its object the provision of a terminal which is practically unaffected by the electrolyte and fumes therefore, non-corrodible.

The terminal consists of an alloy which is molded into the required shape, said alloy consisting of lead, antimony and siliceous material.

In preparing the alloy the ingredients are combined with following proportions:—

| | Per cent. |
|---|---|
| Lead | 80 |
| Antimony | 10 |
| Glass | 10 |

The lead and antimony are brought to a red heat when the glass in powdered form is added and stirred. The molten mass is then molded in the required shape to produce the battery terminal which may be of usual or any preferred form.

The glass hardens the lead and antimony and renders the alloy noncorrodible.

Having thus described the invention, I claim:

The herein described method of producing a battery terminal which is unaffected by the electrolyte and fumes, the same consisting of bringing lead and antimony to a red heat, then adding glass in powdered form to the molten mass at a red heat and stirring, and finally molding the molten mass into the required shape.

In testimony whereof I affix my signature.

CHARLES TURNEY HIXSON. [L. S.]